United States Patent
Griffin

(10) Patent No.: US 11,283,623 B1
(45) Date of Patent: Mar. 22, 2022

(54) SYSTEMS AND METHODS OF USING GROUP FUNCTIONS CERTIFICATE EXTENSION

(71) Applicant: Wells Fargo Bank, N.A., San Francisco, CA (US)

(72) Inventor: Phillip H. Griffin, Raleigh, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 234 days.

(21) Appl. No.: 16/429,629

(22) Filed: Jun. 3, 2019

(51) Int. Cl.
*H04L 29/06* (2006.01)
*H04L 9/32* (2006.01)

(52) U.S. Cl.
CPC .......... *H04L 9/3255* (2013.01); *H04L 9/3268* (2013.01)

(58) Field of Classification Search
CPC ........................... H04L 9/3255; H04L 9/3268
See application file for complete search history.

(56) References Cited

U.S. PATENT DOCUMENTS

| | | | |
|---|---|---|---|
| 6,748,530 B1* | 6/2004 | Aoki | G06F 21/33 713/156 |
| 8,245,047 B2 | 8/2012 | Zaccone et al. | |
| 8,650,403 B2 | 2/2014 | Canard et al. | |
| 9,860,069 B2 | 1/2018 | Patey et al. | |
| 2005/0216742 A1* | 9/2005 | Wong | H04L 9/3247 713/176 |
| 2007/0079139 A1* | 4/2007 | Kim | H04L 9/3247 713/186 |
| 2008/0162927 A1* | 7/2008 | Wang | H04L 9/0833 713/155 |
| 2011/0145567 A1* | 6/2011 | Liu | H04L 63/0823 713/156 |
| 2012/0084567 A1* | 4/2012 | Hwang | H04L 9/3255 713/176 |
| 2014/0173281 A1* | 6/2014 | Hwang | H04L 9/3255 713/171 |
| 2014/0245019 A1* | 8/2014 | Hwang | G06F 21/64 713/176 |
| 2017/0149768 A1* | 5/2017 | Dayka | H04L 63/10 |
| 2017/0230182 A1* | 8/2017 | Misoczki | H04L 9/3247 |
| 2018/0205559 A1* | 7/2018 | Bu er | G06F 21/6263 |
| 2018/0287802 A1* | 10/2018 | Brickell | H04L 9/3263 |
| 2019/0052470 A1* | 2/2019 | Park | H04L 9/3073 |
| 2020/0168307 A1* | 5/2020 | Chen | G06F 16/22 |

FOREIGN PATENT DOCUMENTS

JP 2004046430 A * 2/2004 ......... H04L 63/0823

* cited by examiner

*Primary Examiner* — Michael Simitoski
*Assistant Examiner* — Hany S. Gadalla
(74) *Attorney, Agent, or Firm* — Foley & Lardner LLP

(57) ABSTRACT

Systems and methods relating to an extension of a group signature scheme certificate that allows group users to conduct anonymous transactions in public, with the ability to subsequently audit and confirm signer identity. Auditing and confirmatory functions may include group signature openers that are configured to reveal the identity of a signer that is a member of a group by their signature. Auditing and confirmatory functions may also include group signature linkers that are configured to link two signatures to the same signer using a linking key or linking base.

20 Claims, 4 Drawing Sheets

SYSTEMS AND METHODS OF USING GROUP FUNCTIONS CERTIFICATE EXTENSION

BACKGROUND

There are many different types of digital signature schemes and each type has its own characteristics, usage benefits, and drawbacks. Some of these schemes can be described as anonymous digital signature schemes and they all differ in some way from what may be described as more traditional signatures associated with X.509 digital certificates and the SignedData type defined in the Cryptographic Message Syntax (CMS) standards widely used by businesses (X9.73), in the IETF to implement secure electronic mail, or X.894 that standardizes CMS for the telecommunications industry. Though anonymous digital signatures are known, there is now a renewed interest in their application to new and emerging technologies such as electronic voting, cryptocurrencies, block-chains, distributed ledgers, payments, and smart contracts.

SUMMARY

Group signatures are anonymous digital signature mechanisms in which a relying party uses a single group public key to verify the digital signatures of all group members, while each group member has their own distinct, private signing key. The present disclosure relates to an extension of a group certificate that allows group users to conduct anonymous transactions in public, with the ability to subsequently audit and confirm the signer identity. Auditing and confirmatory functions may include group signature openers that are configured to reveal the identity of a signer that is a member of a group by their signature. Auditing and confirmatory functions may also include group signature linkers that are configured to link two signatures to the same signer using a linking key or linking base.

Various implementations relate to a system including a group manager system. The group manager system including a network interface circuit and a first circuit. The network interface circuit may be configured to receive, from a server, a request including a value from a group function certificate extension. The first circuit may be configured to determine the request includes one of a request to open a signature signed by a group member (e.g., by a group member using a group signature scheme) or link the signature signed by the group member associated with a digital certificate containing the group function certificate extension and execute an action, the action including opening the signature signed by the group member consequent to determining the request comprises the request to open the signature signed by the group member or linking the signature signed by the group member consequent to determining the request comprises the request to link the signature signed by the group member.

In some implementations, the network interface circuit is further configured to receive a signature signed by the group member associated with the group function certificate extension. The action may be to open the signature signed by a group member. The first circuit may be an opening circuit. The group manager system may have a secret master key for use in opening the signature signed by the group member and identifying a group member that signed the signature. In some implementations, the action is to link the signature signed by the group member. The signature signed by the group member may be linked to a second signature signed by the group member. The first circuit may be a linking base circuit. The group manager system may have a linking base for use in linking the signature signed by the group member. In some implementations, the opening circuit is further configured to use the secret master key to open the group signature and identify a signer of the group as the group member that signed the signature. The network interface circuit may be further configured to transmit the identification of the signer of the group to the server. In some implementations, the opening circuit is further configured to determine a sender of the request has a level of authority sufficient to receive the identification of the signer of the group. In some implementations, the network interface circuit is further configured to receive a first signature associated with the group function certificate extension and receive a second signature. The request may include a request to link the first signature to the second signature. In some implementations, the linking base circuit is further configured to use the linking base to attempt to link the first signature to the second signature, and the network interface circuit further configured to transmit an indication of a successful or unsuccessful result to the server. In some implementations, the linking base circuit is further configured to determine a sender of the request has a level of authority sufficient to receive the indication of the successful or unsuccessful result. The server may be one of one or more servers associated with an auditing computing system.

Various other implementations relate to a method. The method may execute on a group manager system. The method may include receiving, from a server, a request including a value from a group function certificate extension, determining the request includes one of a request to open a signature signed by a group member or link the signature signed by the group member associated with a digital certificate containing the group function certificate extension, and executing an action, the action including opening the signature signed by the group member consequent to determining the request comprises the request to open the signature signed by the group member or linking the signature signed by the group member consequent to determining the request comprises the request to link the signature signed by the group member.

In some implementations a method may further include receiving a signature associated with the group function certificate extension. The action may be to open the signature signed by the group member. The group manager system may have a secret master key for use in opening the signature signed by the group member and identifying a group member that signed the signature. In some implementations, the action is to link the signature signed by the group member and the group manager system has a linking base for use in linking the signature signed by the group member. In some implementations, the method further includes using the secret master key to open the signature signed by the group member, identifying a signer of the group as the group member that signed the signature, and transmitting the identification of the signer of the group to the server. In some implementations, the method further includes determining a sender of the request has a level of authority sufficient to receive the identification of the signer of the group. In some implementations, the method further includes receiving a first signature associated with the group function certificate extension and receiving a second signature. The request may include a request to link the first signature to the second signature. In some implementations, the method further includes using the linking base to attempt to link the first signature to the second signature and transmitting an indication of a successful or unsuccessful result to the server. In some implementations, the method further includes determining a sender of the request has a level of authority sufficient to receive the indication of the successful or unsuccessful result. The server may be one of one or more servers associated with an auditing computing system.

Other implementations relate to non-transitory computer-readable storage media storing instructions that are executable by one or more processors to perform operations including one or more of the above methods.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Figure 1:
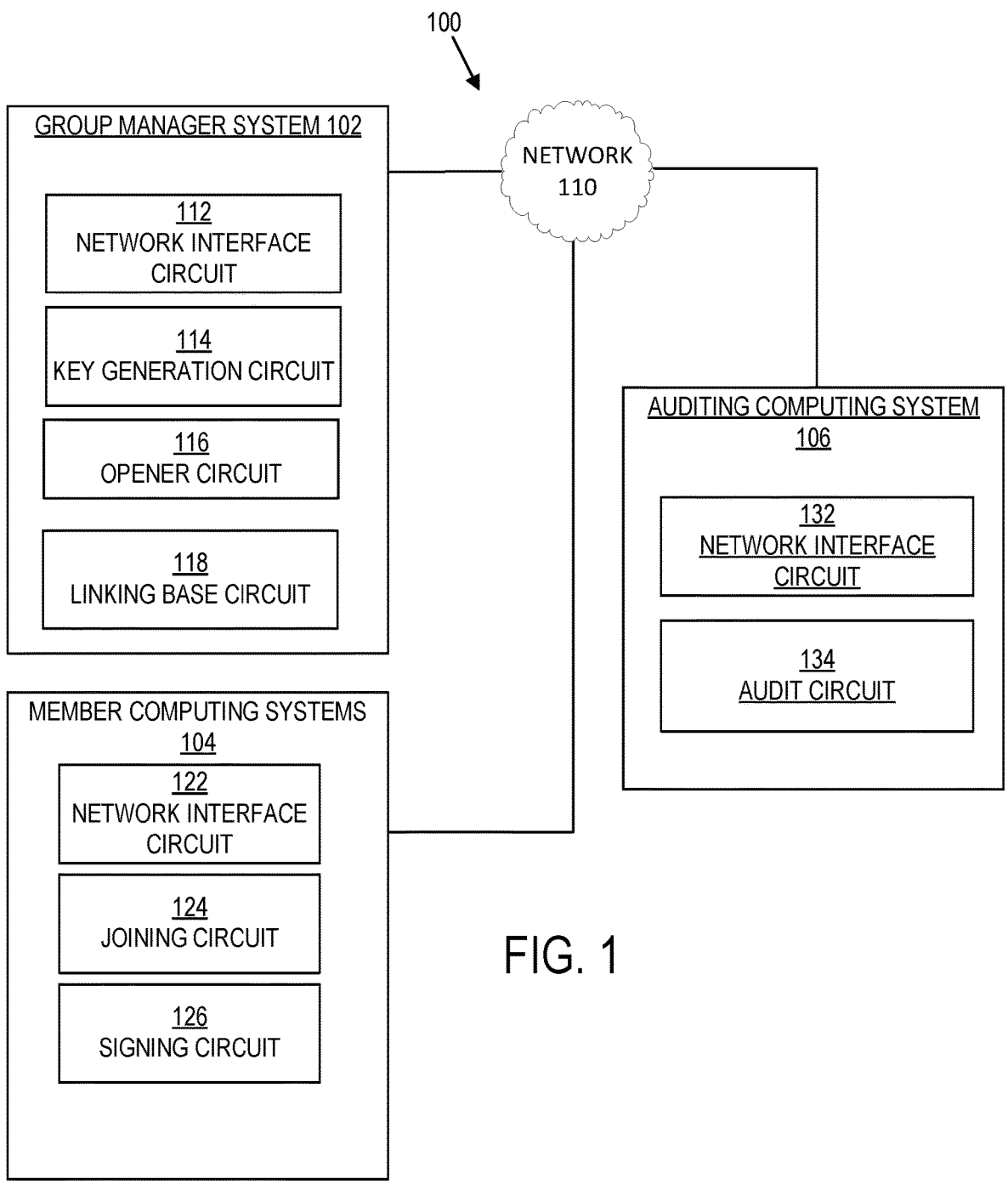
FIG. 1 is a schematic diagram of a group functions certificate extension system, according to an example implementation.

Digital certificates are used by business and organizations (e.g., financial institutions) to authenticate the identities of devices, employees, business partners, and regulators. Cryptographic keys associated with digital certificates may be used to sign ordinary email, create electronic signatures that comply with ESIGN and Uniform Electronic Transactions Act (UETA) requirements, sign transactions or smart contracts in blockchain and distributed ledger technology (DLT) environments, or enable entity authentication. All of these activities expose the subject public key included in these digital certificates to unintended uses, such as use as a non-signer in a ring signature. While digital certificates contain only public keys and other public information, the use of digital certificates in creating and verifying signatures on signed objects can expose organizations to risk, even when the associated private keys are not exposed.

Group signatures are anonymous digital signature mechanisms in which a relying party uses a single group public key to verify the digital signatures of all group members, while each group member has their own distinct, private signing key. The present disclosure relates to an extension of a group certificate that allows group users to conduct anonymous transactions in public, with the ability to subsequently audit and confirm signer identity. Auditing and confirmatory functions may include group signature openers that are configured to reveal the identity of a signer that is a member of a group by their signature. Auditing and confirmatory functions may also include group signature linkers that are configured to link two signatures (i.e., signed data) to the same signer using a linking key or linking base.

In some implementations, in a managed group signature environment each member of the group has a public and private key pair. A group manager, that may or may not also be member of the group, creates the security parameters related to the group and may issue the group public key and work with each member of the group in the creation of their respective private key. The creation of each respective private key may be an iterative process with where each private key is created to work with an already generated group public key. The end result is each group member ends up with each group's own assigned private key paired with the one public key.

In some implementations, the group certificate extension may be designated as non-critical. For example, a certificate authority may validate a digital certificate without checking for the extension and/or any data values associated with the extension. In some implementations, data associate with the extension includes information associated with the group manager. For example, an identifier or contact information. In some implementations, the group manager is identified by a uniform resource identifier (URI) that allows for a determination of who is operating the group allowing for a request to be sent to open a signature associated with one of the group signatures or link two or more signatures associated with one of the group signatures.

In some implementations, the certificate extension facilitates management capability in a group environment. For example, in a distributed ledger or blockchain environment, when two or more members of a group are signing data, the certificate extension allows for regulators with appropriate authority to contact a group manager for opening or linking functionality. In some implementations, this breaks the anonymity or partial anonymity (i.e., where one knows that someone in a group signed data but not the particular person) of the transaction in appropriate circumstances. The regulators may contact the group manager through analysis of the group certificate extension for access to the opening or linking functionality. In some implementations, using linking functionality, partial anonymity is still preserved as the only information provided is that two or more signatures are linked without revealing the particular signer in the group.

In some implementations, the group certificate extension may be used to perform revocation or blacklisting of one or more members of a group. For example as part of a blockchain notary or other entity that is configured to decide whether or not the data can be posted to the blockchain and provide a time stamp service and verification of the digital signature. In some implementations, a notary node can use the group certificate extension information to perform blacklisting or similarly use a revocation list (e.g., a Certificate Revocation List (CRL)) for managing signing behavior of group members or former group members. These blacklists may include Certificate Revocation Lists (CRLs) issued by a Certificate Authority (CA) or using the Online Certificate Status Protocol (OCSP).

In some implementations, the group signature extension solves a technical problem of auditing and regulatory functions in applications where it is necessary to prevent duplicate transactions. For example, applications such as math based currency or electronic voting where it is necessary to detect or prevent payers from spending the same 'coin' twice or prevent the casting of more than one ballot may a voter. The group manager may be able to open a signature signed by a group member by showing which group member created it, where otherwise the signatures would be indistinguishable to those verifying the signature but would in some circumstances have to be audited or regulated. In other words, the group manager may have a secret master key which can be used to extract the identity of the group member from a given signature instance. This may provide the property of signer traceability, sometimes referred to as traceable signatures. Given a group signature instance, no one that is without possession of the secret master key held by the group manage can determine which group member was the signer. Without possession of the secret master key, the capability provides the property of signer anonymity, where the larger the size of the group, the more anonymity for each group member is provided. Similarly, in some implementations, the group manager may be able to link two signatures signed by the same signer where otherwise the signatures would be indistinguishable to those verifying the signature but would in some circumstances have to be audited or regulated. In some implementations, a traceable signature may be used that provides a means to overcome the anonymity of malicious or irresponsible signers, where a tag is used that consists of a list of members and an identifier of an event such as an election or social affair. In this case, a message may be signed related to the event anonymously, but only one time per tag and the tag cannot be reused without loss of anonymity.

In some implementations, the fields of the described extension may be used to help achieve a balance between users who need to remain anonymous to prevent their public transactions from revealing their business activities, and the need for Governance, Risk management, and Compliance (GRC) by the users' organizations. The defined extension may be included in group public key certificates, or the extension's fields may be used in an attribute that can be included in a Directory Access Protocol (DAP) or Lightweight Directory Access Protocol (LDAP) directory, or in the Cryptographic Message Syntax (CMS) messages such as SignedData. Further, including the extension (i.e., a GFCE) may allow group users to conduct anonymous transactions on public blockchains, DLT platforms and other environments and still meet the requirements of their organization for monitoring and auditing to support organizational GRC requirements such as regulatory compliance. The fields of the certificate extension may help to automate transparent logging of business activities, and in meeting obligations to provide Law Enforcement Access (LEA) in environments where the organization operates multiple groups, perhaps on a line of business or transaction partner basis.

In some implementations, for example in a permissioned blockchain or DLT environment, the public key may be part of a digital certificate that can include the GFCE. In permissionless environments, the public key may only be identified by its hash or other mechanism.

Referring to FIG. 1, a schematic diagram of a group functions certificate system 100 is shown, according to an example implementation. The system 100 comprises a group manager system 102, one or more member computing system(s) 104, one or more auditing computing system(s) 106, and a network 110. Each of the group manager system 102, one or more member computing system(s) 104, one or more auditing computing system(s) 106, is in operative communication with one or more of the others via the network 110. The network 110 may include, for example, the Internet, cellular networks, proprietary banking networks, and the like.

Generally, the group manager system 102 is used to manage membership, privacy, and key generation of a plurality of digitally signed data. Although various implementations may be described in connection with example systems and methods, it should be understood that the systems and methods described herein may similarly be used to provide digitally signed data with extensions in undescribed types of systems and methods, such as enterprise security and other types of systems. In some implementations, the group manager system 102 may also be configured to communicate with or function as a Certificate Authority to obtain and/or validate digital certificates or to issue and validate digital certificates. While the group manager system 102, one or more member computing system(s) 104, one or more auditing computing system(s) 106 are shown as separate entities in FIG. 1. In some implementations, the group manager system 102 performs some of or all of the functions of the auditing computing system 106, as described herein. In some implementations, the member computing system 104 performs some of or all of the functions of the group manager system 102 (e.g., the functions of the key generation circuit 114). In some implementations, one or both of the group manager system 102 and the auditing computing system 106 are managed and operated by a financial institution. However, in other implementations, one or both of the group manager system 102 and the auditing computing system 106 are managed and operated by a third-party that is external to a financial institution.

The group manager system 102 includes a network interface circuit 112, a key generation circuit 114, an opener circuit 116, and a linking base circuit 118. Generally, the group manager system 102 is structured to generate keys for signing data. The group manager system 102 may, for example, include one or more servers each with one or more processors configured to execute instructions stored in a memory, send and receive data stored in the memory, and perform other operations to implement use of a group functions certificate extension (GFCE) and related functions described herein. The network interface circuit 112 is structured to facilitate operative communication between the group manager system 102 and other systems and devices over the network 110.

The group manager system 102 may comprise a key generation circuit 114. In some implementations, the key generation circuit 114 is configured to generate a public and private key pair, wherein the public key is the group public key. The key generation circuit 114 may also be configured to enroll members in the group. Enrolling members may including deriving and/or helping to derive their respective private key. In some implementations, the creation of each respective private key may be an iterative process where each private key is created to work with the already generated group public key. The end result is each group member ends up with their own assigned private key paired with the one group public key. Each respective private key is derived to work with established security parameters set by the group manager and the issued public group certificate.

The group manager system 102 may comprise an opener circuit 116. In some implementations, the opener circuit 116 is configured to open a signature signed using a group signature by identifying the member of the group that signed the data. While signatures that are created by different group members are indistinguishable to a verifier of the digital signature, they are not indistinguishable to a computer system controlled by a group manager who can disclose the identity of any member of the group. In some implementations, the group manager system 102 is configured with a secret master key that can be used to extract the identity of the signing group member. This capability provides the property of signer traceability, in what is are sometimes referred to as 'traceable signatures.' No computing system that is not configured to use the secret master key (e.g., a group manager system 102 configured with a secret master key) should be able to determine which group member was the signer. This computing system capability provides the property of signer anonymity, where the larger the size of the group, the more anonymity for each group member is provided. In some implementations, the individual signatures of the group members may be a type of traceable signature, where the signature of a single member of the group may be traced without opening signatures or revealing identifies of any other member of the group.

The group manager system 102 may comprise a linking base circuit 118. In some implementations, the linking base circuit 118 is configured to link two or more received signatures as being signed by the same group member without revealing the identity of the group member. The two or more signatures may be linked using a linking key or linking base. The linking base circuit 118 may further be configured to execute a linking process that is able to take two valid, linkable signatures signed using a group signature scheme and determine if they are linked. In other words, that they have been signed by the same member of the group. In some implementations, linking outputs a value of '1' if the signatures are linked and a value of '0' if the signatures are not linked.

The member computing system 104 may include a network interface circuit 122, a joining circuit 124, and a signing circuit 126. Generally, the member computing system 104 structured to help create private keys for joining a group and sign data. The member computing system 104 may, for example, include one or more processors configured to execute instructions stored in a memory, send and receive data stored in the memory, and perform other operations as part of a group manager system 102. The network interface circuit 122 is structured to facilitate operative communication between the member computing system 104 and other systems and devices over the network 110.

The member computing system 104 may comprise a joining circuit 124. In some implementations, the joining circuit 124 is configured to join a new member using the member computing system 104 to a group by deriving a respective private key for the new group member that is associated with the extant public group key. Further, the joining circuit 124 may be configured to join the group members by deriving a respective private key. The joining circuit 124 may be configured to execute a joining portion of an iterative process where the respective private key for the newly joining group member is created by sending a random number by the joining circuit 124 to a system that determines whether the private key thus created will work with the already generated group public key. The joining circuit 124 may thus be configured such that it receives a respective, assigned private key paired with the one group public key. The joining circuit 124 may be configured to derive each respective private key to work with the established security parameters associated with the group and the issued public group certificate.

The member computing system 104 may comprise a signing circuit 126. In some implementations, the signing circuit 126 is configured to digitally sign data using the private key of a group member associated with the respective member computing system 104. The signing circuit 126 may also be configured to send a request for a digital certificate associated with the private key of the group member. The digital certificate may include the digital certificate group extension as described herein, the extension comprising data allowing for an auditor or other validator to contact a group manager of the group.

The auditing computing system 106 may include a network interface circuit 132 and an audit circuit 134. Generally, the auditing computing system 106 is structured to validate digitally signed data (i.e., signatures). The auditing computing system 106 may, for example, include one or more processors configured to execute instructions stored in a memory, send and receive data stored in the memory, and perform other operations as part of a group manager system 102. The network interface circuit 132 is structured to facilitate operative communication between the auditing computing system 106 and other systems and devices over the network 110.

The auditing computing system 106 may comprise an audit circuit 134. In some implementations, the audit circuit 134 is configured to analyze a group certificate extension of a digital certificate associated with signed data to identify a value associated with the extension identifying a group manager. The audit circuit 134 may further determine whether the group certificate extension is designated as critical or non-critical. For example, the audit circuit 134 may be configured to determine the group certificate extension is designated as critical and further identifies a group manager identifier (e.g., a uniform resource identifier (URI)) associated with who is managing the group. The audit circuit 134 may be configured to send to the group manager a request to open a signature associated with one of the group signatures or link two or more signatures including the signature that may be associated with one of the group signatures. In some implementations, the audit circuit 134 is associated with a regulator with appropriate authority to contact the group manager for opening or linking functionality. In some implementations, an opener or linker is contacted directly through an identifier or other contact information available in the group certificate extension. In some implementations, this breaks the anonymity or partial anonymity (i.e., where one knows that someone in a group signed data but not the particular person) of the transaction in appropriate circumstances. In some implementations, a Certificate Authority has the authority or permission to open and/or link group members in order to perform revocation of privileges and/or functionality or blacklisting of one or more members of a group.

Figure 2:
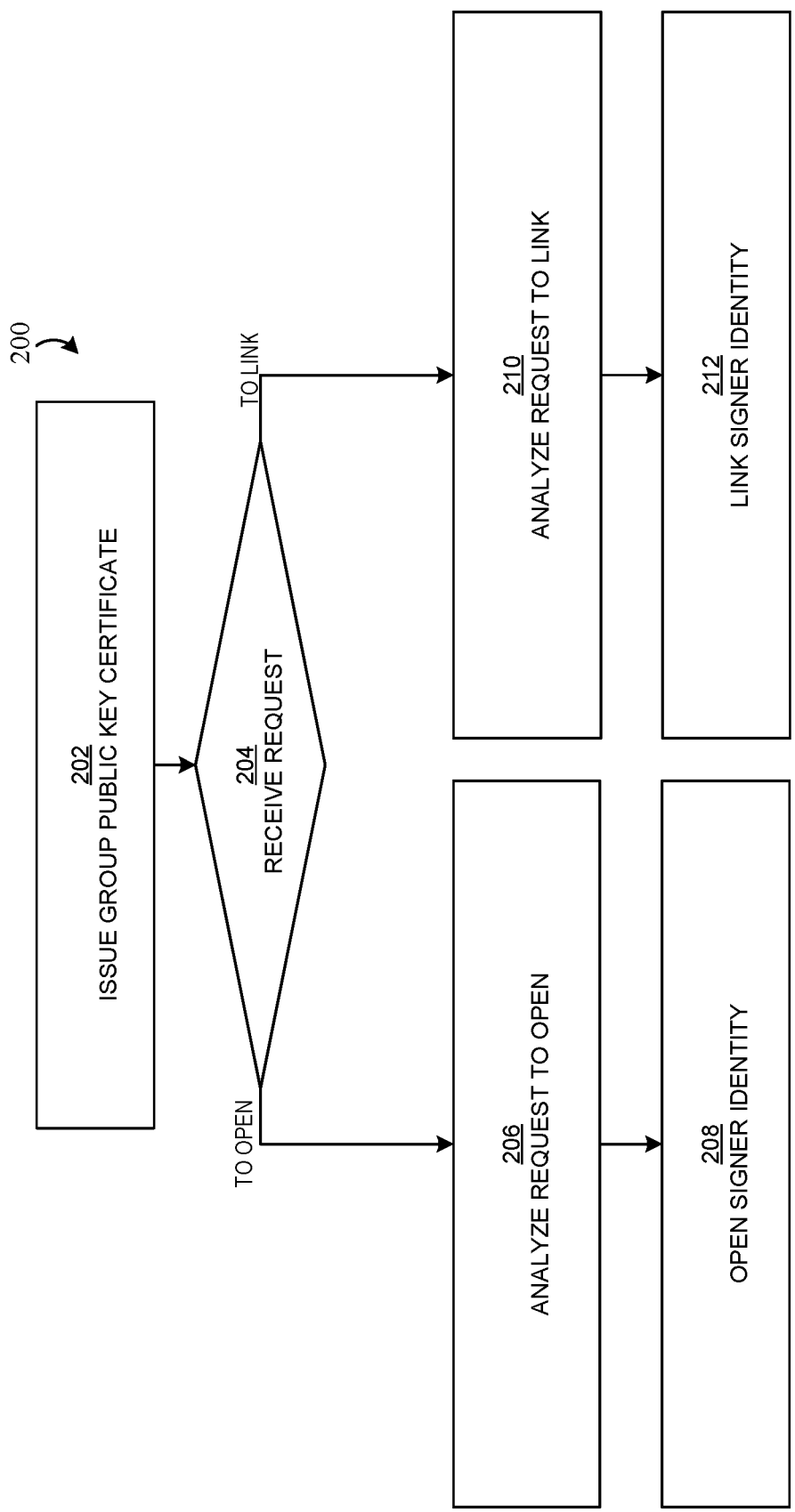
FIG. 2 is a flow diagram of a method of managing a request regarding a group public key certificate according to an example implementation.

Referring to FIG. 2, a flow diagram of a method 200 of managing a request regarding a group public key certificate according to an example implementation. The method 200 may be described in connection with receiving a request to audit signed data and executing the request. In some implementations, method 200 is executed using a group manager system 102 (e.g., a key generation circuit 114, an opener circuit 116, and/or a linking base circuit 118). In brief, method 200 comprises issuing a group public key certificate. If a request associated with the group public key certificate is received, a determination is made whether the request includes either a request to open and/or a request to link. If the request includes a request to open, the request is further analyzed and a signer identity may be opened based on the analyzed request. If the request includes a request to link, the request is analyzed and two or more signatures may be linked to a signer based on the analyzed request.

The method 200 begins at 202 with issuing a group public key certificate. In some implementations, a group public key and/or an associated group public key certificate is requested from a Certificate Authority by a group manager. For example, a group has a plurality of members and a single manager, all associated with a single signature verification key. A trusted authority (e.g., a Certificate Authority) establishes the group with a public digital certificate associated with the group public key with each group member having their own signing private key with which digital signatures that can be verified using the group public key. The group manager may be able to open a signature associated with any group signature by showing which group member signed the associated signature or linking two signatures by associating it with the same group member without necessarily revealing the identity of the same group member. In some implementations, a group manager when creating the group sets some security parameters (e.g., ISO, IC2008 standard group signature parameters). Once security parameters are set the group may be set up through the issuance of a public key for the group and a public digital certificate associated with the public key through a request to a Certificate Authority or self-issuance. Each member of the group may be enrolled by deriving their respective private key. The creation of each respective private key may be an iterative process with where each private key is created to work with the already generated group public key. The end result is each group member ends up with their own assigned private key paired with the one public key. Each respective private key is derived to work with the established security parameters and the issued public group certificate. The issued public group certificate is issued with an extension (e.g., a group signature extension). The group certificate extension may analyzed (e.g., by an auditing computing system 106) to identify a value associated with the extension identifying the group manager. The group certificate extension may be designated as non-critical. For example, a certificate authority may validate a digital certificate without checking for the extension and/or any data values associated with the extension. In some implementations, the group manager is identified by a uniform resource identifier (URI) that allows for a determination of who is operating the group allowing for a request to be sent to open a signature associated with one of the group signatures or link two or more signatures potentially associated with one of the group signatures. In some implementations, the certificate extension allows for a regulator with appropriate authority to contact the group manager for opening or linking functionality. In some implementations, this breaks the anonymity or partial anonymity (i.e., where one knows that someone in a group signed data but not the particular person) of the transaction in appropriate circumstances. The certificate extension may also be used perform revocation or blacklisting of one or more members of a group. For example, by providing a Certificate Authority with the group information needed to check the signature against a revocation list or blacklist. time stamp service and verification of the digital signature. In some implementations, a notary node can use the group certificate extension information to perform blacklisting or similarly use a revocation list for managing signing behavior of group members or former group members. A secure channel may have to be initiated between the group manager and each group member to maintain a secure, managed group.

In one implementation, creating a functional linkable group signature comprises (1) key generation, (2) signing, (3) verification, (4) linking, and (5) revocation. The first part (1) of a group manager creating a group signature may comprise key generation. The group manager creates the group public parameters. The group manager executes an issuing process which is executed between the group manager and each group member to create a unique signature key with a private key and a group membership certificate for each group member. In some implementations, the group manager chooses the group public parameters and random generators. Adding a member is an iterative process where the group manager does not know the final result, private key created for the member but the group manager chooses a random prime number and computes a value that the member can check against. The second part (2) of a group manager creating a group signature may comprise the ability of a group member to sign by taking as an input the group member signature key, a linking base, and the data to be signed and outputting a linkable signature. The third part (3) may comprise verification comprising taking a message, a linkable signature, and the group private key corresponding to the group. In some implementations, a value of '1' is returned if the signature is valid and a value of '0' if the signature is not valid. The fourth part (4) may comprise a linking process that is able to take two valid, linkable signatures and determine if they are linked. In other words, that they have been signed by the same member of the group. In some implementations, linking outputs a value of '1' if the signatures are linked and a value of '0' if the signatures are not linked. The fifth part (5) may comprise a revocation part. In some implementations a private key revocation is implemented. In some implementations, a verifier blacklist is implemented. For example, in a verifier blacklist implementation, a verifier (i.e., a Certificate Authority) may generate a blacklist where the linking tag of any revoked members is checked against future signatures. In some implementations, if the check fails a value of '0' is outputted (i.e., revoked) and validates if a value of '1' is outputted.

At 204, a request is received and a determination is made whether the request includes either a request to open and/or a request to link. to prohibit the signature from being used as part of a ring signature. In some implementations, the request comprises a value obtained from the group certificate extension of the digital certificate that is associated with the request to open and/or link. In some implementations, the request is received by a linker and/or opener that is At 206, the request to open is analyzed if a determination is made at 204 that the request includes a request to open. In some implementations, the request is analyzed to determine if the request is appropriate. For example, the request is analyzed to determine if (1) the request is being made to the appropriate group manager, (2) the request is valid such that the data was correctly signed with a signature of one of the group members of the group, and/or (3) the requestor has the appropriate authority and/or interest to make the request.

At 208, the identity of a signer is opened. In some implementations, a group manager of the group has the ability to open a signature signed by a group member by identifying the member of the group that signed the data. While signatures that are created by different group members are indistinguishable to a verifier of the digital signature, they are not indistinguishable to the group manager who can disclose the identity of any member of the group. In some implementations, the group manager has a secret master key that can be used to extract the identity of the signing group member. This capability provides the property of signer traceability, in what is are sometimes referred to as 'traceable signatures.' No one that is without possession of the secret master key (e.g., a secret master key held by a group manager) should be able to determine which group member was the signer. This capability provides the property of signer anonymity, where the larger the size of the group, the more anonymity for each group member is provided. identified in the group certificate extension. In some implementations, the individual signatures of the group members may be a type of traceable signature, where the signature of a single member of the group may be traced without opening signatures or revealing identities of any other member of the group.

At 210, the request to link is analyzed if a determination is made at 204 that the request includes a request to link. In some implementations, the request is analyzed to determine if the request is appropriate. For example, the request is analyzed to determine if (1) the request is being made to the appropriate group manager, (2) the request is valid such that the two or more data was correctly signed with a signature of one or more of the group members of the group, and/or (3) the requestor has the appropriate authority and/or interest to make the request.

At 212, a plurality of signed data (i.e., signatures) is linked to a signer identity. In some implementations, two are more received data are attempted to be linked based on a determination that the request is being made to the appropriate group manager, the request is valid such that the two or more data was correctly signed with a signature of one or more of the group members o the group, and the requestor has the appropriate authority and/or interest to make the request. The two or more signatures may be linked using a linking key or linking base.

Figure 3:
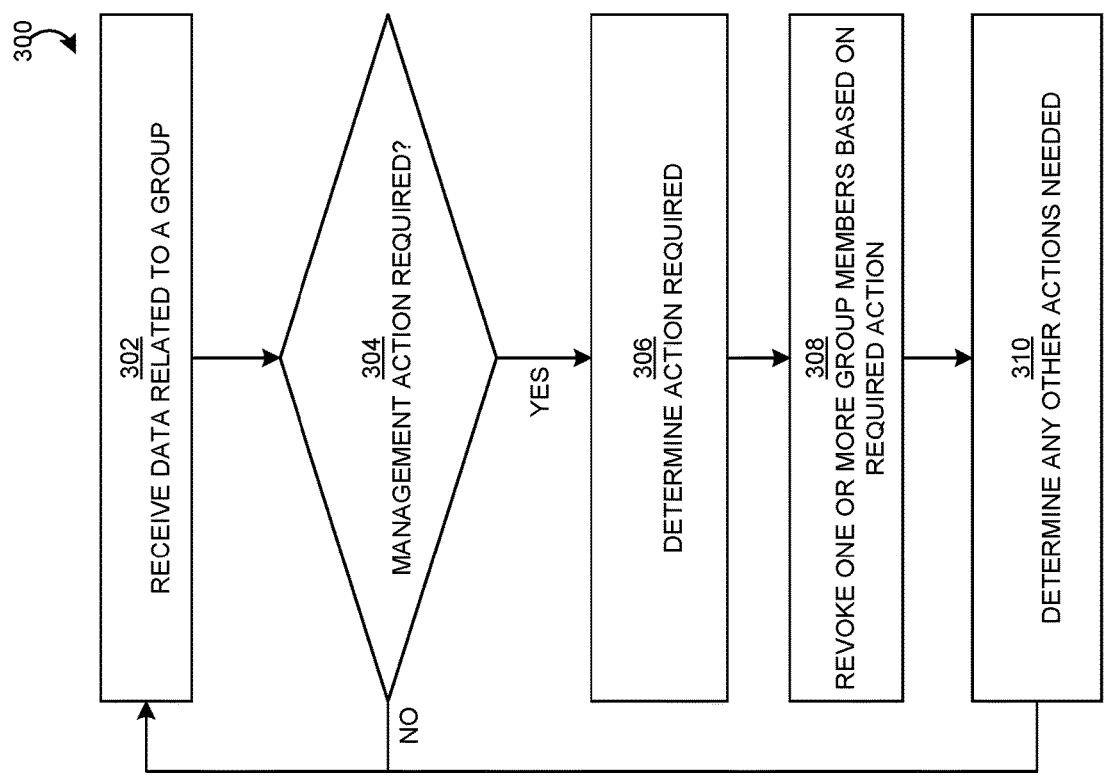
FIG. 3 is a flow diagram of a method of managing membership of a group public key, according to an example implementation.

Referring to FIG. 3, a flow diagram of a method 300 of managing membership of a group public key is shown, according to an example implementation. In some implementations, the method 300 is executed using a group manager system 102 (e.g., a key generation circuit 114 of a group manager system 102). In brief, method 300 comprises receiving data related to a group and determining if management action is required. If management action is required, the action required is determined, one or more group members may be revoked from the group based on the required action, and a determination is made if any other actions are needed.

Still referring to FIG. 3 and in more detail, at 302, data related to a group is received. In some implementations, the data may be associated with one or more member of the group. The data may be associated with a request to remove a member or add a member to the group. The data may be a request to revoke group membership of one or more members of the group or to revoke membership of all members of the group and/or dissolve the group. In some implementations, the data related to the group may be information related to improper, malicious, or unlawful activity related to one or more group members that may prompt further action by the group manager.

At 304, a determination is made if management action is required and what action is required at 306. In some implementations, a management action may be the revocation of group membership from a member of a group or a revocation of an available capability from a member of the group. The action required may be a creation or update of a blacklist or revocation list. In some implementations, the action required may be to revoke the entire group, revoke a single group member, or modify or remove specific signing capabilities of one or more members of the group. Where the action is being done by the Certificate Authority, the management action may be incorporated directly into a Digital Certificate validation or verification functionality of the Certificate Authority. Where the action is being done by a management system that is not the Certificate Authority, the action may comprise sending instructions or an update to a Certificate Authority. The instructions or update may be signed or comprise other verification of the authority of the sender to make the requested changes.

At 308, one or more group members may added or have membership revoked based on the determination of what action is required. In some implementations, the revocation is done by a verifier blacklist. For example, in a verifier blacklist implementation, a verifier (i.e., a Certificate Authority) may generate a blacklist where the linking tag of any revoked members is checked against future signatures. In some implementations, if the check fails a value of '0' is outputted (i.e., revoked) and validates if a value of '1' is outputted. In some implementations, the blacklist or an update to the blacklist is transmitted to one or more Certificate Authorities that generate and/or verify digital certificates with the group certificate extension. In some implementations, the group manager may function as the Certificate Authority. Up to three levels of revocation may be performed, for example, the entire group may be revoked, a single group member may be revoked, or specific signing capabilities of one member may be revoked. For example, a single member may have the ability to sign a math-based-currency transaction revoked. In some implementations, up to four levels of revocation may be performed, for example, private key revocation, verifier blacklist, signature revocation, and credential update.

At 310, a determination is made if any other actions are needed. In some implementations, a revocation action may lead to other actions that need to be executed. For example, while a member may have the authorization to perform a first functionality revoked, it may be instead replaced by a second functionality. Other actions may include, transmitting a notification to the group member that the revocation has occurred. The notification may include details on why there is a revocation and/or what the group member would have to do to rejoin the group and/or regain functionality that was removed. For example, a member may have their ability to use the group signature in a wealth management application on a distributed but still be allowed to use the group signature as regards to consumer banking.

Figure 4:
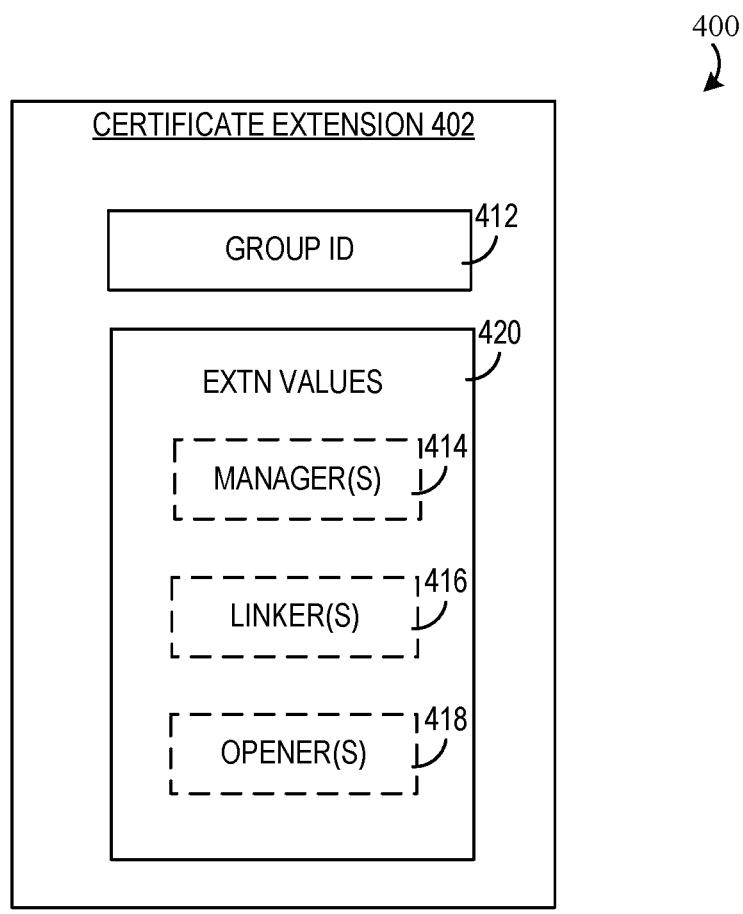
FIG. 4 is a schematic diagram of a certificate extension model, according to an example implementation.

Referring to FIG. 4, a block diagram 400 of a certificate extension model is shown, according to an example implementation. The block diagram 400 comprises a certificate extension 402 including components. The components may comprise, for example, at least a Group ID 412. The components may further comprise such components as Manager(s) 414, Linker(s) 416, and/or Opener(s) 418. As a non-limiting example, the extension may be defined as follows:

groupFunctions EXTENSION::={
    SYNTAX GroupFunctions
    IDENTIFIED BY id-ce-groupFunctions
    }

The certificate extension 402 comprises a Group ID 412 and/or Extn Values 420. The Extn Values 420 may comprise Manager(s) 414, Linker(s) 416, and/or Opener(s) 418 As a non-limiting example, the extension may be defined as follows:

GroupFunctions::=SEQUENCE {
        groupID GroupID,
        manager Manager OPTIONAL,
        linkers Linkers OPTIONAL,
        openers Openers OPTIONAL
    }

In some implementations, the extension is non-critical, so would not necessarily prevent validation of a digital certificate if missing, but would not allow for audit, regulatory scrutiny, or other legal scrutiny of a signature associated with signed data. In some implementations, where the group identifier is present in this certificate extension 402, the group identifier may be used to identify and/or contact a group manager. The extension may also open up availability to other group functions. In some implementations, the group functions comprise a Group ID 412 which may be a natural language string that is used to identify the group. The group functions may comprise a Manager 414 URI for identifying a group manager. The Linker(s) 416 and Opener(s) 418 may be a sequence of URIs in a group functions implementation where there may be more than one of each. For example, there may be a plurality of linkers, identified by Linker(s) 416 from the group extension where each different linker is associated with a particular legal jurisdiction. In other words, a plurality of linkers and/or openers may be created in the extension, each associated with its own URI and the appropriate legal or regulatory authority could select the appropriate linker and/or opener for its respective jurisdiction.

The implementations described herein have been described with reference to drawings. The drawings illustrate certain details of specific implementations that implement the systems, methods, and programs described herein. However, describing the implementations with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor which, in some example implementations, may execute instructions stored, or otherwise accessed, via different areas of memory). Alternatively or additionally, the one or more processors may be structured to perform or otherwise execute certain operations independent of one or more co-processors. In other example implementations, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some implementations, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit," as described herein, may include components that are distributed across one or more locations.

An exemplary system for implementing the overall system or portions of the implementations might include a general purpose computing computers in the form of a computer, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some implementations, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other implementations, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example implementations described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied.

The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions and arrangement of the implementations without departing from the scope of the present disclosure as expressed in the appended claims.

What is claimed:

1. A group manager system comprising:
    a network interface circuit configured to:
        receive, from a server, a request comprising a value from a group function certificate extension; and
        receive, from the server, a uniform resource identifier associated with a group manager in response to determining that the group function certificate extension is required for validation of a digital certificate; and
    a first circuit configured to:
        determine the request comprises a request to open a signature signed by a group member or a request to link the signature signed by the group member associated with the digital certificate, wherein the digital certificate contains the group function certificate extension;
        in response to determining that the request comprises the request to open the signature signed by the group member, open the signature signed by the group member; and
        in response to determining that the request comprises the request to link the signature signed by the group member, link the signature signed by the group member.

2. The system of claim 1, wherein the network interface circuit is further configured to receive the signature signed by the group member associated with the digital certificate containing the group function certificate extension, wherein the action is to open the signature signed by the group member, wherein the first circuit is an opening circuit, and wherein the group manager system has a secret master key for use in opening the signature signed by the group member and identifying a group member that signed the signature.

3. The system of claim 2, further comprising, the opening circuit configured to use the secret master key to open the signature signed by the group member, identify a signer of a group as the group member that signed the signature, and wherein the network interface circuit is further configured to transmit the identification of the signer of the group to the server.

4. The system of claim 3, the opening circuit further configured to determine a sender of the request has a level of authority sufficient to receive the identification of the signer of the group.

5. The system of claim 1, wherein the action is to link the signature signed by the group member, the first circuit is a linking base circuit, and wherein the group manager system comprises a linking base for use in linking the signature signed by the group member.

6. The system of claim 5, the network interface circuit further configured to receive a first signature associated with the group function certificate extension and receive a second signature, and wherein the request comprises a request to link the first signature to the second signature.

7. The system of claim 6, further comprising, the linking base circuit configured to use the linking base to attempt to link the first signature to the second signature, and the network interface circuit further configured to transmit an indication of a successful or unsuccessful result to the server.

8. The system of claim 7, wherein the linking base circuit is further configured to determine a sender of the request has a level of authority sufficient to receive the indication of the successful or unsuccessful result.

9. The system of claim 1, wherein the server is one of one or more servers associated with an auditing computing system.

10. A method, executing on a group manager system, the method comprising:
    receiving, from a server, a request comprising a value from a group function certificate extension;
    receiving, from the server, a uniform resource identifier associated with a group manager in response to determining that the group function certificate extension is required for validation of a digital certificate; and
    determining the request comprises a request to open a signature signed by a group member or a request to link the signature signed by the group member associated with the digital certificate containing the group function certificate extension;
    in response to determining the request comprises the request to open the signature signed by the group member, opening the signature signed by the group member; and
    in response to determining the request comprises the request to link the signature signed by the group member, linking the signature signed by the group member.

11. The method of claim 10, further comprising receiving the signature signed by the group member associated with a digital certificate containing the group function certificate extension, wherein the action is to open the signature signed by the group member, and wherein the group manager system has a secret master key for use in opening the signature signed by the group member and identifying a group member that signed the signature.

12. The method of claim 11, further comprising using the secret master key to open the signature signed by the group member, identifying a signer of a group as the group member that signed the signature, and transmitting the identification of the signer of the group to the server.

13. The method of claim 12, further comprising determining a sender of the request has a level of authority sufficient to receive the identification of the signer of the group.

14. The method of claim 10, wherein the action is to link the signature signed by the group member, and wherein the group manager system has a linking base for use in linking the signature signed by the group member.

15. The method of claim 14, further comprising receiving a first signature associated with the group function certificate extension and receiving a second signature, and wherein the request comprising a request to link the first signature to the second signature.

16. The method of claim 15, further comprising using the linking base to attempt to link the first signature to the second signature and transmitting an indication of a successful or unsuccessful result to the server.

17. The method of claim 16, further comprising determining a sender of the request has a level of authority sufficient to receive the indication of the successful or unsuccessful result.

18. The method of claim 10, wherein the server is one of one or more servers associated with an auditing computing system.

19. A non-transitory computer-readable storage media storing instructions that are executable by one or more processors to perform operations comprising:

receiving, from a server, a request comprising a value from a group function certificate extension;

receiving, from the server, a uniform resource identifier associated with a group manager in response to determining that the group function certificate extension is required for validation of a digital certificate; and determining the request comprises a request to open a signature signed by a group member or a request to link the signature signed by the group member associated with the digital certificate containing the group function certificate extension;

in response to determining the request comprises the request to open the signature signed by the group member, opening the signature signed by the group member; and in response to determining the request comprises the request to link the signature signed by the group member, linking the signature signed by the group member.

20. The non-transitory computer-readable storage media of claim 19, the operations further comprising receiving the signature signed by the group member associated with the group function certificate extension, wherein the action is to open the signature signed by the group member, and wherein the storage media comprises a secret master key for use in opening the signature signed by the group member and identifying a group member that signed the signature.

* * * * *